(12) United States Patent
Shyamal et al.

(10) Patent No.: US 11,694,092 B2
(45) Date of Patent: Jul. 4, 2023

(54) REWARD-BASED RECOMMENDATIONS OF ACTIONS USING MACHINE-LEARNING ON TELEMETRY DATA

(71) Applicant: VMWARE, INC., Palo Alto, CA (US)

(72) Inventors: Sudarshan Shyamal, Pune (IN); Amita Ranjan, Bangalore (IN); Vibhu Rastogi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 1454 days.

(21) Appl. No.: 15/821,897

(22) Filed: Nov. 24, 2017

(65) Prior Publication Data
US 2019/0080251 A1 Mar. 14, 2019

(30) Foreign Application Priority Data

Sep. 14, 2017 (IN) .............................. 201741032628

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ................................. G06N 20/00; G06N 5/04
See application file for complete search history.

(56) References Cited

U.S. PATENT DOCUMENTS

| | | | | |
|---|---|---|---|---|
| 9,098,813 B1* | 8/2015 | Konig | .................... | G06N 20/00 |
| 2008/0306808 A1* | 12/2008 | Adjali | ................ | G06Q 30/0204 |
| | | | | 705/7.32 |
| 2017/0024424 A1* | 1/2017 | Almohizea | ........... | G06F 16/248 |
| 2017/0185894 A1* | 6/2017 | Volkovs | .................... | G06N 3/08 |

\* cited by examiner

*Primary Examiner* — Eric Nilsson
(74) *Attorney, Agent, or Firm* — Su IP Consulting (57) ABSTRACT

System and methods for automatically providing action recommendations are described. A method may include collecting a set of telemetry data from a client application. The set of telemetry data contains a plurality of pages generated based on a plurality of user actions performed on the client application. The method may include generating a plurality of prior probabilities corresponding to the plurality of pages and the plurality of user actions. In response to the client application displaying a first page, the method may generating a plurality of posterior probabilities for a subset of user actions that can be invoked in the client application from the first page, and selecting a plurality of recommended actions from the subset of user actions for having the highest corresponding posterior probabilities among the plurality of posterior probabilities.

16 Claims, 4 Drawing Sheets

REWARD-BASED RECOMMENDATIONS OF ACTIONS USING MACHINE-LEARNING ON TELEMETRY DATA

RELATED APPLICATIONS

Benefit is claimed under 35 U.S.C. 119(a)-(d) to Foreign Application Serial No. 201741032628 filed in India entitled "REWARD-BASED RECOMMENDATIONS OF ACTIONS USING MACHINE-LEARNING ON TELEMETRY DATA", on Sep. 14, 2017, by VMware, Inc., which is herein incorporated in its entirety by reference for all purposes

BACKGROUND

In a cloud computing environment, applications and systems are becoming more and more complex, as many of the functions in these applications and systems are delivered by cloud-based services such as database-as-a-service, search-as-a-service, etc. Users of a seemingly simple web-based application may easily be overwhelmed by the application's large amount of functions and services. Thus, users are more inclined towards an application which can provide recommendations in selecting any of its functions and services. However, many applications are designed with a preconfigured set of recommendations, without considering the users' preferences or historical usage patterns. Further, even when some applications may be designed to record usage data generated by users of the application, these usage data may become too large for effective processing.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Figure 1:
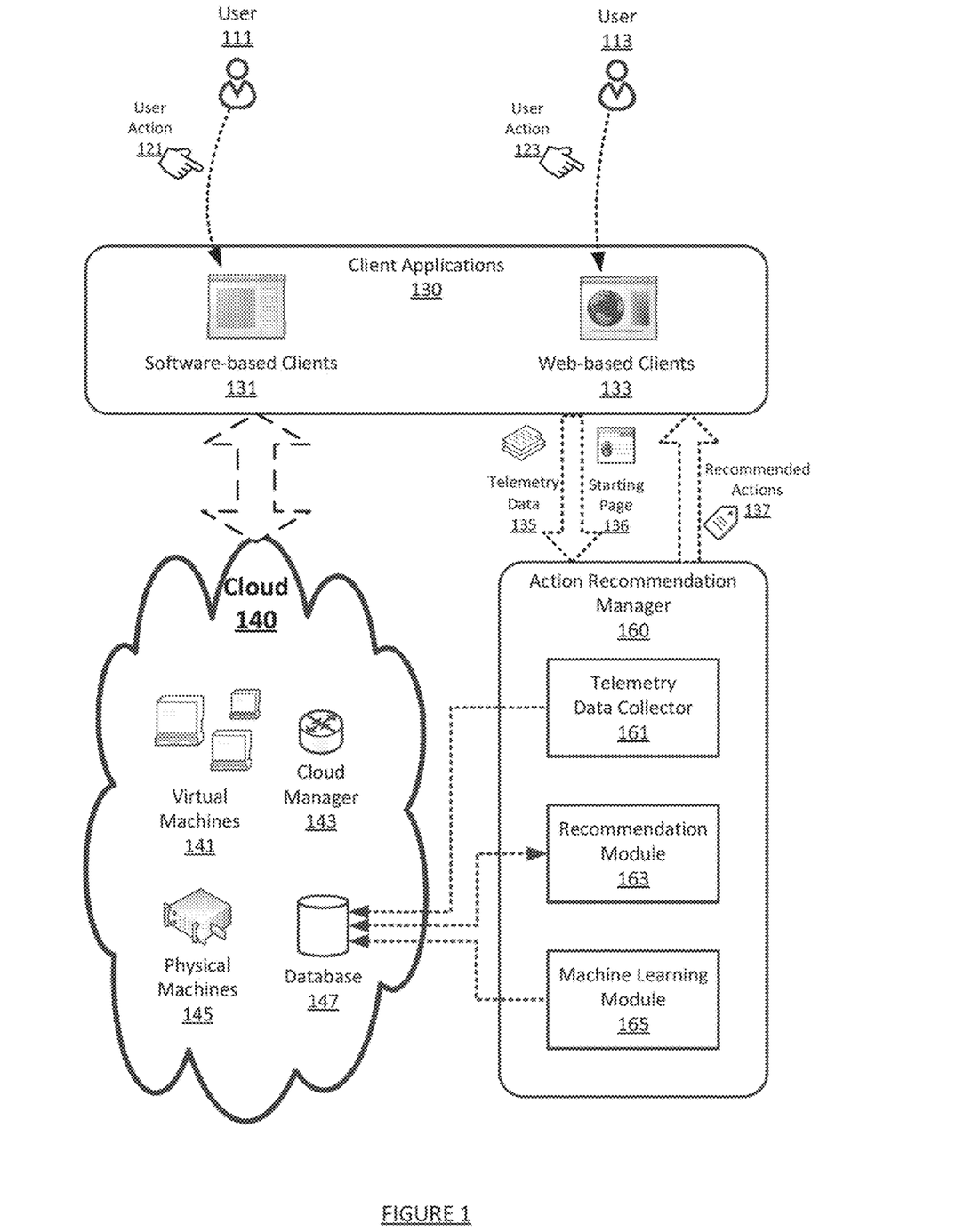
FIG. 1 illustrates a block diagram of a system configured to provide reward-based recommendations of actions using machine-learning on telemetry data in a cloud environment, according to one or more embodiments of the present disclosure.

FIG. 1 illustrates a block diagram of a system configured to provide reward-based recommendations of actions using machine-learning on telemetry data in a cloud environment, according to one or more embodiments of the present disclosure. In FIG. 1, a cloud environment may include one or more clouds 140. The cloud environment may be managed by an action recommendation manager 160. Users 111 and 113 may utilize the client applications 130 to access the various functions and services provided by the cloud 140. The action recommendation manager 160 may be configured to collect telemetry data 135 from the users 111 and 113's during their previous accessing of the client applications 130, and to predict and provide to the users 111 and 113 subsequent recommended actions 137 that can be performed on the client applications 130 based on the collected telemetry data and the starting page 135 of the client applications 130 the users 111 and 113 are accessing.

In some embodiments, a "cloud" 140 in the cloud environment may be a network-based computing architecture that provides shared pools of cloud resources on demand. A "virtual machine cloud" (or VM cloud) in the cloud environment may be a cloud implemented using virtualized computing resources. The cloud 140 may contain, among other components, one or more virtual machines (VMs) 141 and/or physical machines 145. Further, each cloud may include a cloud manager 143 configured for implementing the various cloud functionalities such as resource pooling, resource allocating, high-availability, and automation etc. In some embodiments, the cloud 140 may be constructed using products such as VMWARE® vCloud, and the cloud manager 143 may be implemented using a VMWARE vRealize Suite. For example, the cloud 140 may be configured to implement VMWARE VRealize Automation ("VRA"), configured to perform VMWARE VRealize Operations ("VROPS"), or configured with a VMWARE VSPHERE server. Alternatively, the cloud 140 may be implemented using any commercial cloud products, such as OpenStack® Cloud, and/or AMAZON® S3 Cloud.

In some embodiments, the cloud manager 143 may include a VM manager (not shown in FIG. 1) to create one or more VMs 141 based on one or more physical machines 145. The physical machine 145 may be a physical computer system having a "physical hardware platform" (e.g., an x86 architecture platform). The physical machine 145 may include a "hypervisor", which is configured to construct a "virtual hardware platform" for the VM 141 based on the physical machine 145's physical hardware platform. In other words, a "virtual machine" (VM) 141 may be an abstraction of an actual physical machine 145. The VM manager may coordinate the multiple hypervisors associated with the VMs 141 together to form a distributed (virtual) system (e.g., the cloud 140). Thus, the cloud 140 may be constructed using multiple physical machines 145, and using multiple VMs 141 that are created based on some of the physical machines 145.

In some embodiments, the physical hardware platform of the physical machines 145 may include various "physical hardware components" such as, without limitation, one or more physical Central Processing Units (CPUs), physical memory, physical storage (e.g., hard drive), physical Network Interface Card (NIC), and/or additional electronic circuit components (all of which are not shown in FIG. 1). The VM manager may configure the virtual hardware platform of the VM 141 with one or more "virtual hardware components" such as, without limitation, one or more virtual CPUs, virtual memory, virtual storage, virtual NIC, and/or additional virtual components. With help from the VM manager, the virtual hardware components may emulate the behaviors and the computing capabilities of the corresponding physical hardware components, thereby allowing the VM 141 to function as if it were a physical machine 145.

In some embodiments, the cloud 140 (as well as the VMs 141 and the physical machines 145 contained therein) may be configured to provide various computational services to the client applications 130. The client applications 130, which may include various software-based clients 131 and web-based clients 133, may be any graphical or non-graphical user-interfacing applications (or modules/components) designed to interact with the users 111 and 113. The software-based clients 131 may be any conventional software interfaces designed to display information and accept user inputs from the users 111 and 113. Examples of software-based clients 131 may include the client partitions of software applications such as, without limitations, word processor, spreadsheet, accounting application, database, media player, graphic editor, game, or photo editor. The software-based clients 131 may also include the client partitions of mission-critical enterprise management and production engineering applications, such as enterprise resource planning (ERP), document management, business workflow management, hardware engineering and software engineering applications. The web-based clients 133 may be provided via web browsers such as, without limitations, Internet Explorer®, Firefox®, and Chrome®.

In some embodiments, the client applications 130 may present to the users 111 and 113 with page-by-page of display and information. Each "page" may refer to a specific arrangement of information and graphic elements displayed on a specific client application 130. Further, the users 111 and 113 may interact with the client applications 130 via various user actions 121 and 123. A "user action" may refer to a user-interface operation available on a particular page of a specific client application 130, and may be activated by the users 111 and 113. Examples of user actions 121 and 123 may include, without limitations, keyboard inputs, mouse inputs (e.g., single mouse click, double click), and touch-screen inputs.

In some embodiments, a single page of a client application 130 may include one or more user-action options, each of which can be activated by users 111 and 113. For example, when a user 111 accessing a specific word-processor client application 130 (e.g., MICROSOFT® WORDS), the word-processor may display to the user 111 a first page which may be a document-editing page. The document-editing page may provide user-action options such as "Save", "Edit", "Insert", etc. The user 111 may select and issue a specific user action 111 (e.g., Save) based on these user-action options. Alternatively, a client application 130 may be a web browser including user-action options such as a text-input field for inputting web addresses and multiple menu items. A user 113 may input a user action 123 which is a keyboard input of a web address into the web browser, or input a user action 123 which is a mouse clicking on a menu item or a button in the web browser.

In some embodiments, different pages of a single client application 130 may be associated with each other by various user actions 121 and 123. In other words, after a user 111 activates a specific user action 121 on a first page of the client application 130, the client application 130 may process the user action 121 and display a second page to the user 111 in response to such user action 121. The "first" page may be referred to as "original" or "starting" page, and the "second" page may be referred to as a "resulting" or "next" page. Thus, the second page may be related to the first page via the specific user action 121. Further, a single client application 130 may generate different resulting pages from a single starting page based on different user actions 121 and 123, and may generate a same resulting page from different starting pages based on different user actions 121 and 123. For example, an email client application 130 displaying a starting page showing an email's detail may generate an email-editing resulting page when a user 113 issues a "reply" user action 123, or generate an email-removed resulting page when the user 113 issues a "delete" user action 123. Similarly, this email client application 130 may generate the same inbox resulting page when the user 113 issues a corresponding "return-to-inbox" user action 123 from the email-editing starting page or the email-deleting starting page. Also, a starting page and a resulting page from a user action 123 may be the same page.

In some embodiments, the "telemetry data" may refer to past or historical usage patterns of users 111 and 113 utilizing the client applications 130. Specifically, telemetry data may include a set of user actions 121 perform by a user 111 on a particular client application 130, and include a sequence of pages (each page may be a starting page of a subsequent page in the sequence, and/or a resulting page of a previous page in the sequence) generated by the particular client application 130 in response to the set of user actions 121 by the user 111. Such telemetry data may be used for predicting subsequent/future user actions 121 (from any particular starting page of the client application 130) that may be selected by the user 111. The telemetry data may also include historical user actions 121 and 123 performed by multiple users 111 and 113 on multiple client applications 130, as well as the starting and resulting pages associated with these user actions 121 and 123.

In some embodiments, an action recommendation manager 160 may be configured to collect telemetry data 135 generated from users 111 and 113 accessing the client applications 130, analysis the telemetry data 135, and predict/generate recommended actions 137 to the client applications 130. The client applications 130 may present the recommended actions 137 to the users 111 and 113 by displaying e.g., a "recommendation pop-up window" in the client application 130, in order to help the users 111 and 113 in selecting their likely follow-up user actions 121 and 123. The users 111 and 113 may select one of the recommended actions 137 to issue the next user action 121, without having to go through the normal path of locating and invoking the user action 121 from multiple user-action options.

In some embodiments, the action recommendation manager 160 may be configured with, among other components, a telemetry-data-collector 161, a recommendation-module 163, and a machine-learning module 165. The telemetry-data-collector 161 may be configured to collect past usage patterns of all the users 111 and 113 utilizing the client applications 130, and store the collected usage patterns as telemetry data 135 in a database 147 in the cloud 140. The recommendation-module 163 may study/analyze the telemetry data in the database 147 by using a classifier (e.g., a Naive Bayes Classifier). Depending on a specific starting page 136 of a particular client application 130 currently being displayed to a user 111, the recommendation-module 163 may generate a set of recommended actions 137 as the predicted most feasible set of user actions the specific user 111 may subsequently select from and perform. Further, based on the feedback received from the client application 130 with respect to the actual user action 121 performed by the specific user 111 (regardless of whether the user 111 selected from the recommended actions 137 or not), the machine-learning module 165 may perform reinforcement learning to reward or penalize the predicted result as per user's feedback.

For example, a performance-intensive client application 130 may have a lot of features that are used by different users 111 and 113 depending on their roles and permissions. The users 111 and 113 may not be able to keep track of all the actions they performed on the client applications 130. Therefore, the telemetry-data-collector 161 may be configured to record the telemetry data including all the user actions 121 and 123 performed by the users 111 and 113 on the client application 130. The recommendation-module 163 may then use these telemetry data to predict the next courses of action as recommended actions 137 to the users 111 and 113, and may present the recommended actions 137 to the users 111 and 113 to simplify user selection. In other words, the future course of action can be inferred from the past usage history of the users, or it can also be deduced from other users having similar pattern of usages.

In some embodiments, the action recommendation manager 160 may be implemented as a service in the cloud 140. For example, the action recommendation manager 160 may be a VMWARE vRealize Operations Manager ("vROps") with predictive analysis and smart alerts capabilities. The action recommendation manager 160 may not only ensure optimal performance and availability of the applications, services, and infrastructure in the cloud 140, but also provide monitoring capability across different client applications 130 and record telemetry data 135 generated by the users 111 and 113. Further, the action recommendation manager 160 may utilize parallelism and in-memory processing to handle exponential growth of telemetry data 135.

Figure 2:
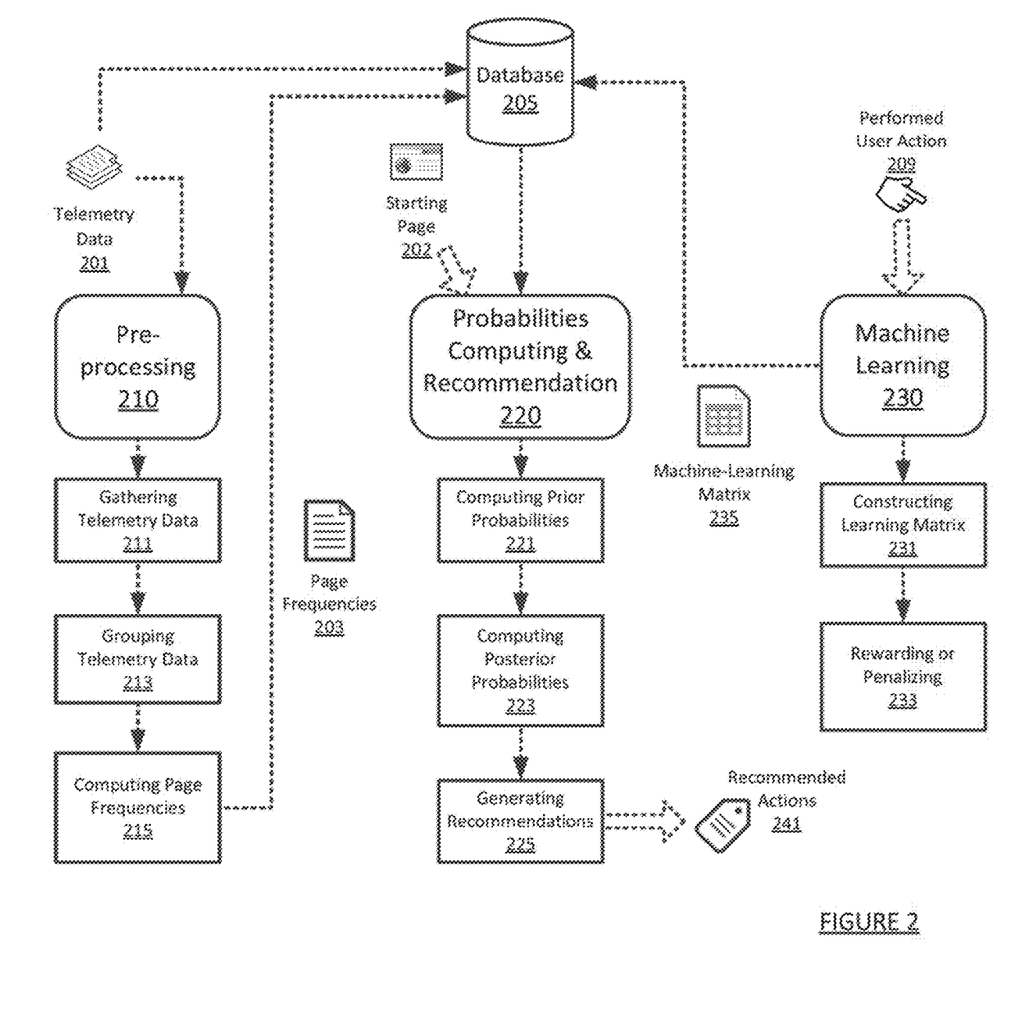
FIG. 2 illustrates a process for collecting telemetry data and generating recommended actions, according to one or more embodiments of the present disclosure.

FIG. 2 illustrates a process for collecting telemetry data and generating recommended actions, in accordance with one or more embodiments of the present disclosure. In FIG. 2, an action recommendation manager (similar to the action recommendation manager 160 of FIG. 1) may be configured to perform a process including the following operations: pre-processing 210, the probability computing & recommendation 220, and the machine-learning 230. Specifically, a telemetry-data-collector of the action recommendation manager may perform the pre-processing 210 to collect telemetry data 201 (similar to the telemetry data 135 of FIG. 1) from client applications in a cloud environment, and store the telemetry data 201 in a database 205 (similar to the database 147 of FIG. 1). A recommendation-module of the action recommendation manager may perform the probability-computing & recommendation 220 to generate a set of recommended actions 241 for a user based on a starting page 202 of a specific client application the user is accessing. Afterward, the action recommendation manager may transmit the set of recommended actions 241 to the client application in response to the starting page 202. Based on a subsequent user action 209 performed on the client application in view of the set of recommended actions 241, a machine-learning module of the action recommendation manager may perform the machine-learning 230 to generate a machine-learning matrix 235, and store the machine-learning matrix 235 in the database 205. The machine-learning module may further refine and optimize the machine-learning matrix 235 based on the performed user action 209 as feedback.

In some embodiments, the telemetry-data-collector may perform the following pre-processing operations: including without limitation, gathering-telemetry-data 211, grouping-telemetry-data 213, and computing-page-probabilities 215. Specifically, in the gathering-telemetry-data operation 211, the telemetry-data-collector may collect telemetry data generated by one or more users accessing one or more client applications. For example, the telemetry-data-collector may use GOOGLE Chrome®' HTTP Trace plugin to gather user actions performed in the cloud environment. Optionally, the telemetry-data-collector may filter the user actions, and retain those telemetry data that are related to page accessing and page updating. The collected telemetry data may be stored in the database 205 in a form as shown in Table 1 below.

TABLE 1

| User | Timestamp | Telemetry ID |
| --- | --- | --- |
| User-1 | 1485497223332 | Admin-Solutions |
| User-1 | 1485497255464 | Admin-Policies |
| User-2 | 1485497278842 | Admin-Environment-Overview |
| User-2 | 1485497319571 | Object-Summary |

In Table 1, column "User" may refer to the IDs of users accessing the client applications; column "Timestamp" may refer to the time stamp of a specific user action; and column "Telemetry ID" may refer to the identification of the pages displayed to the users or accessed by the users. In other words, a specific telemetry ID may be an identifier of a starting page. A specific telemetry ID may also be associated with a resulting page generated based on a user action performed on a specific starting page. For example, "Action-Environment-Overview" may be an identifier of a starting page showing an environment overview window; and "Object-Summary" may be a resulting page after a user issued a user action "Get Summary" on a starting page.

In some embodiments, in the grouping-telemetry-data operation 213, the telemetry-data-collector may sort the telemetry data based on individual users, and generate a set of tables each of which is associated with one of the users. In other words, the telemetry-data-collector may divide the telemetry data for all users into non-overlapping groups based on users. The Table 2 below may show the divided telemetry data associated with user "User-1":

TABLE 2

| User | Timestamp | Telemetry ID |
| --- | --- | --- |
| User-1 | 1485497223332 | Admin-Solutions |
| User-1 | 1485497255464 | Admin-Policies |

In some embodiments, in the computing-page-frequencies operation 215, the telemetry-data-collector may count the occurrences of each unique telemetry ID for all the users in the telemetry data, and store such occurrences information as page frequencies 203. Afterward, the telemetry-data-collector may store the page frequencies 203 in the database 205. Examples of the page frequencies 203 may be shown in Table 3 below. In Table 3, the page with telemetry ID "Admin-Solutions" may have a frequency count of 11, meaning this page may be accessed 11 times by a specific user in the telemetry data.

TABLE 3

| Telemetry ID | Frequency Count |
| --- | --- |
| Admin-Solutions | 11 |
| Admin-Environment-Overview | 7 |

TABLE 3-continued

| Telemetry ID | Frequency Count |
| --- | --- |
| Dashboard | 5 |
| Admin-policies | 4 |

In some embodiments, based on the various information gathered and summarized by the telemetry-data-collector, the recommendation-module may perform the following "probability-computing and recommendation" 220 operations: including without limitation, computing-prior-probabilities operation 221, computing-posterior-probabilities operation 223, and generating-recommendations operation 225. When a user interacts with a client application, he may move from a starting page to a resulting page by performing a specific user action. From any particular starting page, there are a limited number of user actions the user can invoke. For example, if the client application is on an "Administration" starting page, the user may perform a user action to go to "Policies" page or "Licensing or Alerts" page, but he may not have access to the "Alert Definitions" page. Thus, the recommendation-module may define all the possible user actions which can be performed from a starting page, and count the corresponding frequencies of these user actions accordingly.

In some embodiments, the recommendation-module may perform the computing-prior-probabilities operation 221 by generating a transaction-frequency table for each user. Specifically, the recommendation-module may take into account all the user actions a specific user may have permissions to perform in a client application, and generate a frequency count for each user action transition, as shown in Table 4 below.

TABLE 4

| Starting Page Telemetry ID | Resulting Page Telemetry ID | Frequency Count |
| --- | --- | --- |
| Admin-Solutions | Admin-Environment-Overview | 4 |
| Dashboard | Admin-Solutions | 3 |
| Admin-Environment-Overview | Object-Summary | 3 |
| Content-Dashboards | Admin-Solutions | 2 |
| Dashboard | Alerts-All | 2 |

In Table 4's example, based on the recommendation-module's analysis of the telemetry data, the specific user performed 4 times of a user action to reach "Admin-Environment-Overview" resulting page from the starting page "Admin-Solutions", and performed 3 times of another user action to reach "Admin-Solutions" resulting page from the starting page of "Dashboard". Further, the specific user may perform different user actions to reach two different resulting pages ("Admin-Solutions" and "Alert-All") from the same starting page of "Dashboard", or reach the same resulting page ("Admin-Solutions") from different starting pages ("Dashboard" and "Content-Dashboards").

In some embodiments, once the recommendation-module obtained all the frequency tables as shown above, the recommendation-module may compute the probabilities of the possible user actions from each starting page using a Naive Bayes Classifier. "Naive Bayes Classifier" assumes that the presence of a particular feature in a class is unrelated to the presence of any other feature. For example, a fruit may be considered to be an apple if it is red, round, and about 3 inches in diameter. Even if these features depend on each other or upon the existence of the other features, all of these properties independently contribute to the probability that this fruit is an apple, and that is the reason such a probability classification may be referred to as 'Naive'.

In some embodiments, the recommendation-module may calculate a prior probability table for all the pages and user actions associated with a particular client application, as shown in Table 5 below. In Table 5's example, based on a number of times (11 times) the user accessed the page "Admin-Solutions" and a total number of pages accessing by the user (e.g., 52 times) in the telemetry data, the recommendation-module may calculate that this page may have a prior-probability value of 11/52=20.8%.

TABLE 5

| Telemetry ID | Count | Prior Probability |
| --- | --- | --- |
| Admin-Solutions | 11 | 0.208 |
| Admin-Environment-Overview | 7 | 0.136 |
| Dashboards | 5 | 0.1 |
| Admin-Policies | 4 | 0.077 |

In some embodiments, the recommendation-module may perform the computing-posterior-probabilities operation 223 to calculate posterior probabilities for all the user actions that are allowed to be performed from a starting page. Specifically, the recommendation-module may utilize a Bayes theorem formula to calculate the posterior probability P, as shown below:

$$P(c \mid X) = \frac{P(X \mid c)P(c)}{P(X)}$$

where P(c) is the prior probability of class c, P(X) is the prior probability of predictor X, P(X|c) is the prior probability of predictor X given class c, and P(c|X) is the posterior probability of class (c) given predictor (X). In other words, P(X) and P(c) may be deemed the prior probabilities of a specific starting page and a specific resulting page, P(X|c) may be deemed the prior probability of a corresponding user action associated with the specific starting page and the specific resulting page, and P(c|X) may be deemed the "posterior probability" of the corresponding user action associated with the specific starting page and the specific resulting page.

For example, assuming a user may have the options to perform a first user action U from a starting page A to a resulting page B, and a second user action V from the starting page A to a resulting page C. The recommendation-module may first calculate the posterior probability of the user action U by first retrieving from Table 5 above the prior probabilities of the starting page A and the resulting page B (i.e., P(X) and P(c)). Afterward, the recommendation-module may calculate a prior probability (i.e., P(X|c)) for the user action U by determining the probability of the resulting page B being generated from the starting page A using the Table 4 and Table 5 above. Based on these three prior probabilities, the recommendation-module may calculate the posterior probability of the user action U based on the above Bayes theorem formula. Likewise, the recommendation-module may use the Bayes theorem formula above to calculate the posterior probability of the user action V, based on the prior probabilities of the pages A and C, as well as the prior probability of the user action V.

In some embodiments, the recommendation-module may perform the generating-recommendations 225 based on the above formula. Specifically, the recommendation-module may receive from the client application a starting page 202 of a client application currently being accessed by a user. The recommendation-module may calculate the posterior probabilities of all the possible user actions that can be invoked from the starting page 202. Assuming the user is accessing a starting page "Admin-Solutions", the recommendation-module may calculate the posterior probability of the user actions that can lead to resulting pages "Admin-Environment Overview", "Dashboard", and "Admin-policies". Afterward, the recommendation-module may select from all the possible user actions one or more user actions with the highest posterior probabilities as the recommended actions 241. Alternatively, the recommendation-module may select the user actions having the top-n (e.g., top-5) highest posterior probabilities as the most likely user actions (i.e., the recommended actions 241) the user may undertake from the starting page 202.

In some embodiments, after the recommended actions 241 were provided to the client application, the user of the client application may perform a subsequent user action which may or may not be one of the recommended actions 241. Regardless, the client application may transmit the user's performed user action 209 as a feedback to the action recommendation manager. The machine-learning module of the action recommendation manager may perform subsequent machine-learning operation 230 which includes, without limitations, a constructing-learning-matrix operation 231 and a rewarding-or-penalizing operation 233.

In some embodiments, the machine-learning module may first perform the constructing-learning-matrix operation 231 to generate a machine-learning matrix 235 based on telemetry data retrieved from the database 205. Specifically, the "machine-learning matrix" 235 may contain a set of starting pages and a set of resulting pages generated by a particular client application. The machine-learning matrix 235 may also include user actions each of which associates one of the starting pages with one of the resulting pages contained therein. Further, the machine-learning matrix 235 may assign a corresponding preference value to each of the user actions (or each of the associations between the starting pages and the user actions). Each "preference value" may be a numeric value for determining a user's preference to the corresponding user action. The machine-learning module may utilize the Table 2 and Table 4 above to populate the starting/resulting pages and user actions in the machine-learning matrix 235, assign an initial value (e.g., zero) to all the preference values in the machine-learning matrix 235, and store the generated machine-learning matrix 235 in the database 205.

In some embodiments, the machine-learning module may utilize the posterior probabilities calculated above as the preference values for the user actions in the machine-learning matrix 235. Specifically, for each starting page in the machine-learning matrix 235, the machine-learning module may identify all the user actions and resulting pages associated with this starting page. The machine-learning module may then utilize the recommendation-module to calculate the prior probabilities of the starting page and the resulting pages, as well as the prior probabilities of these user actions. Afterward, the machine-learning module may generate a corresponding posterior probability for each of the user actions using the Bayes theorem formula shown above, and assign the corresponding posterior probability as the preference value for each of the user actions (or associations between the starting pages and the user actions) in the machine-learning matrix 235.

In some embodiments, based on the machine-learning matrix 235 stored in the database 205, the recommendation-module may provide a set of recommended actions 241 without having to dynamically calculate the posterior possibilities of the user actions. In other words, the recommendation-module may retrieve the starting page 202 from the machine-learning matrix 235, and directly retrieve a set of user actions that are associated with this starting page 202. Afterward, the recommendation-module may evaluate the preference values associated with the set of user actions, and select a number of the user actions having the top-n highest preference values as the recommended actions 241. Such an approach allows quick generating of the recommendation actions 241 for the client application.

In some embodiments, the machine-learning module may use a reinforcement learning approach to determine whether to reward or penalize the recommended actions 241 provided by the recommendation-module. In other words, if the performed user action 209 indicates that the user selected one of the recommended actions 241, the machine-learning module may reward the above algorithm and the machine-learning matrix 235 from which the recommended actions 241 are generated. If the performed user action 209 shows that the user didn't choose from the recommended actions 241 and performed a different user action instead, the machine-learning module may penalize the algorithm and adjust the machine-learning matrix 235, in order to subsequently generate better recommended actions 241.

In some embodiments, the reinforcement learning approach adapted by the machine-learning module may maximize the notion of cumulative reward by using a Q-learning algorithm. Q-Learning algorithm may utilize an action-value function that gives the expected utility of taking a given action in a given state. In other words, the Q-Learning algorithm can determine how good an action is given a certain state based on a maximize function Q(s, a) as defined:

$$Q(s, a) = \text{immediate reward for making an action} + \text{best utility } (Q) \text{ for the resulting state.}$$

Formally, the function Q(s, a) may be defined as:

$$Q(s,a) = r(s,a) + \gamma \max_{a'}(Q(s', a'))$$

where r(s, a) denotes immediate reward; γ denotes to a relative value (between 0 to 1) of delayed vs. immediate rewards; a denotes an action; a' denotes a new action; s denotes to a state; and s' denotes to a new state after action a.

In some embodiments, the machine-learning module may assign γ with a value 0.5. And Q(s, a) may be deemed the machine-learning matrix 235. When a user performs a user action 209 that is chosen from the recommended actions 241, the preference value for this user action 209 in the machine-learning matrix 235 may be rewarded a fixed value (e.g., 10 points), while the other choices in the recommended actions 241 are penalized with a fixed value (e.g., 0 point or negative points) in the machine-learning matrix 235. The machine-learning matrix 235 Q(s, a) may be adjusted and updated accordingly during the subsequent iterations of action recommendations, till the machine-learning matrix 235 Q(s, a) converges towards optimal solution, meaning additional rounds of reinforcement learning would not significant change the machine-learning matrix 235.

In some embodiments, once the machine-learning matrix 235 converges, the recommendation-module may generate the recommended actions 241 directly from the machine-learning matrix 235 Q(s, a). Alternatively, after a certain period (e.g., one month), the machine-learning module may discard the machine-learning matrix 235 in the database 205, and generate a new machine-learning matrix 235 based on telemetry data 201, as described above. In some embodiments, the telemetry data and the machine-learning matrix 235 may contain different users in the cloud environment having similar roles. In this way, the action recommendation manager may study the usage patterns of these different users, and can deduce the user actions based on collaboration from these users.

Figure 3:
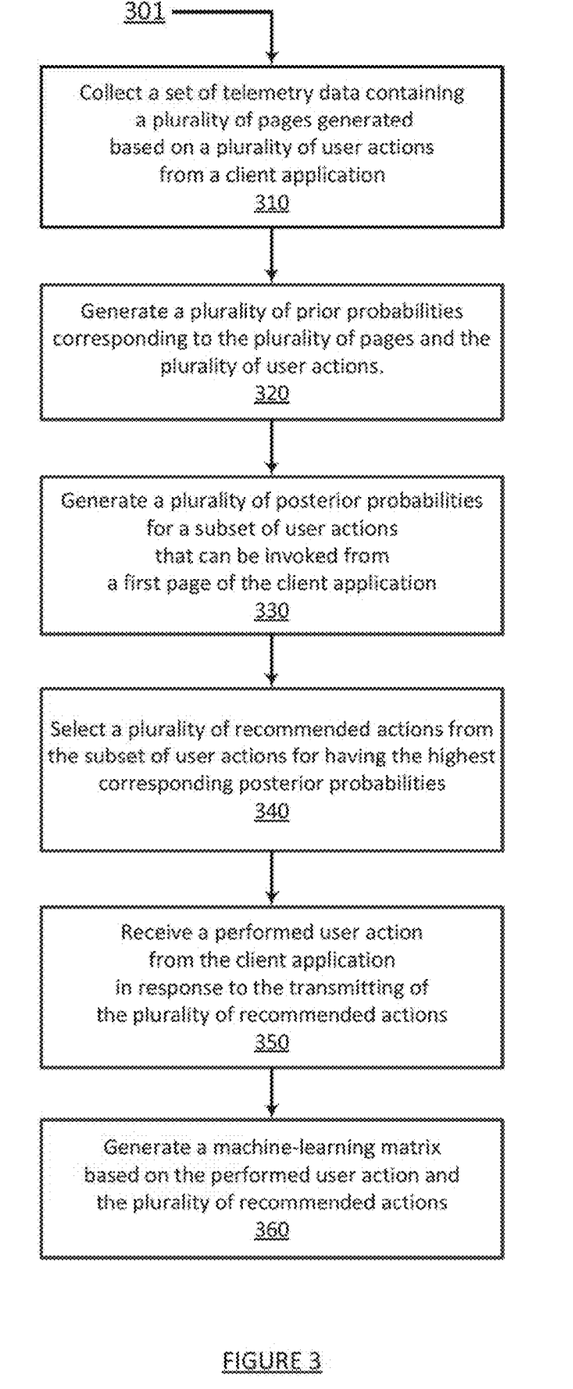
FIG. 3 shows a flow diagram illustrating a process for automatically providing action recommendations in a cloud environment, according to one or more embodiments of the present disclosure.

FIG. 3 shows a flow diagram illustrating a process for automatically providing action recommendations in a cloud environment, according to one or more embodiments of the present disclosure. The processes 301 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, an action recommendation manager operating in the cloud environment may be configured to collect a set of telemetry data from a client application operating in the cloud environment. The set of telemetry data may contain a plurality of pages generated based on a plurality of user actions performed on the client application. In some embodiments, for a subset of pages selected from the plurality of pages and a subset of user actions selected from the plurality of user actions, the client application's performing of each of the subset of user actions from the first page of the client application may generate a corresponding one of the subset of pages. In other words, the first page may be referred to as a starting page, and each of the subset of pages may be referred to as a resulting page generated after the client application performed a specific user action from the first page.

At block 320, the action recommendation manager may generate a plurality of prior probabilities corresponding to the plurality of pages and the plurality of user actions. Specifically, the action recommendation manager may generate prior probabilities for the first page and its resulting pages (e.g., the subset of pages) based on the telemetry data, and generate prior probabilities for the subset of user actions selected from the plurality of user actions based on the prior probabilities of the first page and its associated resulting pages.

At block 330, in response to the client application displaying the first page which is selected from the plurality of pages, the action recommendation manager may generate a plurality of posterior probabilities for the subset of user actions that can be invoked in the client application from the first page. Specifically, the action recommendation manager may generate a corresponding posterior probability for each of the subset of user actions based on the corresponding prior probabilities of the first page, the subset of pages, and the subset of user actions.

At block 340, the action recommendation manager may select a plurality of recommended actions from the subset of user actions for having the highest corresponding posterior probabilities among the plurality of posterior probabilities. In some embodiments, the plurality of recommended actions may have the top-n highest corresponding posterior probabilities among the subset of user actions. Specifically, the action recommendation manager may sort from the highest (largest) to the lowest(smallest) the subset of user actions based on their corresponding posterior probabilities, and select the first n (e.g., 5) number of user actions from the sorted subset of user actions as the plurality of recommended actions for having the top-n highest corresponding posterior probabilities.

At block 350, the action recommendation manager may transmit the plurality of recommended actions to the client application, and receive a performed user action from the client application in response to the transmitting of the plurality of recommended actions.

At block 360, the action recommendation manager may generate a machine-learning matrix based on the performed user action and the plurality of recommended actions. Specifically, the machine-learning matrix contains associations among the plurality of pages and the plurality of user actions, and contains preference values corresponding to the associations.

Figure 4:
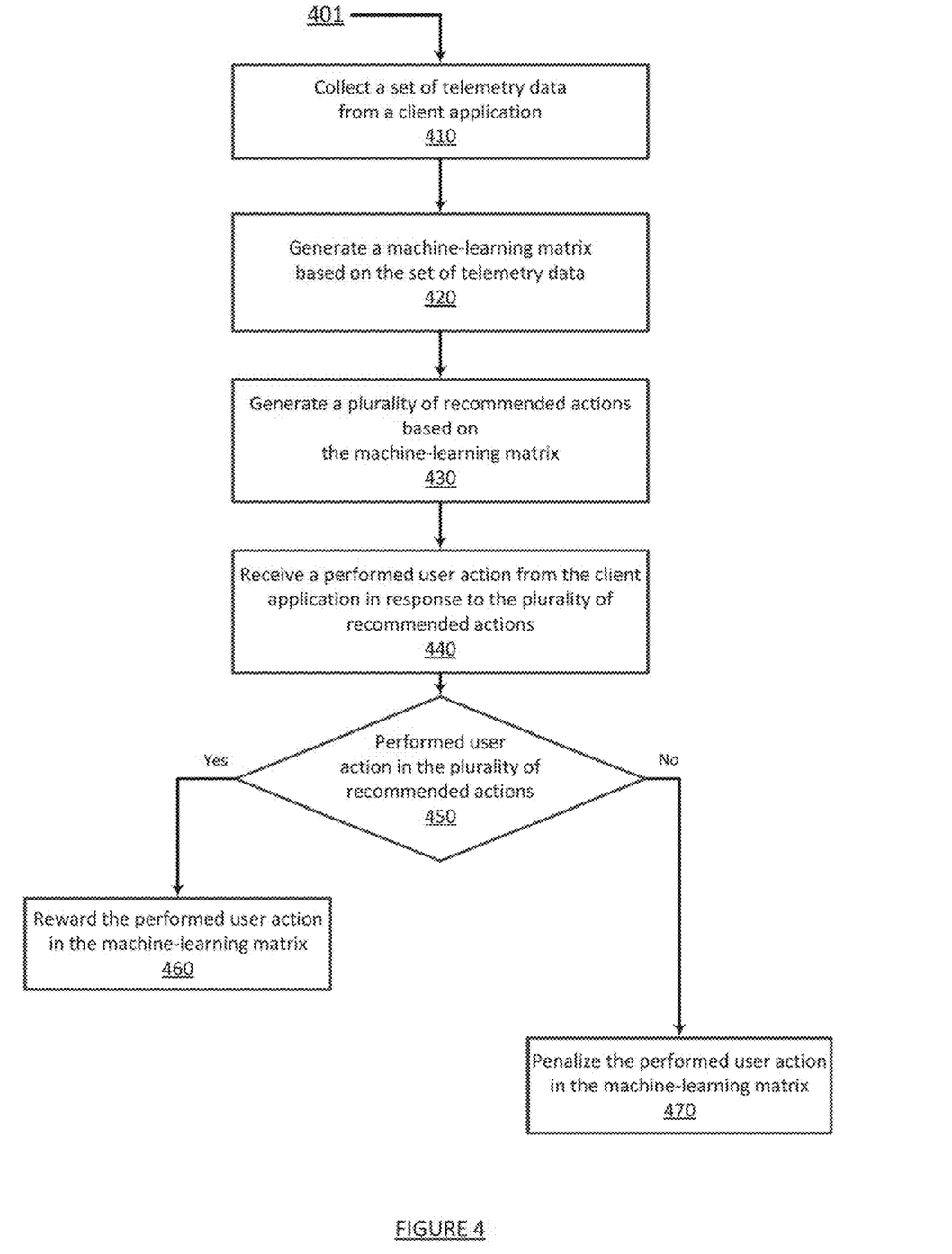
FIG. 4 shows a flow diagram illustrating a process for automatically providing action recommendations based on a machine-learning matrix, according to one or more embodiments of the present disclosure.

FIG. 4 shows a flow diagram illustrating a process for automatically providing action recommendations based on a machine-learning matrix, according to one or more embodiments of the present disclosure. The processes 401 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

At block 410, an action recommendation manager operating in the cloud environment may collect a set of telemetry data from a client application operating in the cloud environment. The set of telemetry data contains a plurality of pages generated based on a plurality of user actions performed on the client application.

At block 420, the action recommendation manager may generate a machine-learning matrix based on the set of telemetry data. Specifically, the machine-learning matrix contains associations among the plurality of pages and the plurality of user actions, and contains preference values corresponding to the associations. Further, the action recommendation manager may generate a plurality of prior probabilities corresponding to the plurality of pages and the plurality of user actions, generate a plurality of posterior probabilities for the plurality of user actions based on the plurality of prior probabilities, and assign the preference values for the associations among the plurality of pages and the plurality of user actions using the plurality of posterior probabilities.

At block 430, in response to the client application displaying a starting page selected from the plurality of pages, the action recommendation manager may generate a plurality of recommended actions based on the machine-learning matrix. The plurality of recommended actions may have the highest preference values (or the top-n highest preference values) based on the starting page.

At block 440, the action recommendation manager may receive a performed user action from the client application in response to a transmitting of the plurality of recommended actions to the client application.

At block 450, the action recommendation manager may adjust the machine-learning matrix by evaluating the performed user action against the plurality of recommended actions.

At block 460, when the performed user action is one of the plurality of recommended actions, the action recommendation manager may increase (reward) a corresponding preference value of an association between the first page and the performed user action in the machine-learning matrix. In some embodiments, if the machine-learning matrix converges, the action recommendation manager may stop adjusting the machine-learning matrix.

When the performed user action is not one of the plurality of recommended actions, at block 470, the action recommendation manager may decrease (penalize) a corresponding preference value of an association between the first page and the performed user action in the machine-learning matrix. After awarding or penalizing, the action recommendation manager may repeat the operation in the above block 430, in order to generate additional recommended actions based on the adjusted machine-learning matrix.

Thus, systems and methods for automatically providing action recommendations in a cloud environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:
1. A method for automatically providing action recommendations in a cloud environment including one or more physical machines, one or more virtual machines, and a database, the method comprising:

collecting, by an action recommendation manager implemented in the cloud environment, a set of telemetry data from a client application operating in the cloud environment and storing the set of telemetry data in the database, wherein the set of telemetry data contains a plurality of pages generated based on a plurality of user actions performed on the client application;

generating, by the action recommendation manager, a plurality of prior probabilities corresponding to the plurality of pages and the plurality of user actions;

in response to the client application displaying a first page selected from the plurality of pages, generating, by the action recommendation manager, a plurality of posterior probabilities for a subset of user actions selected from the plurality of user actions and can be invoked in the client application from the first page, wherein the plurality of posterior probabilities are generated based on the plurality of prior probabilities;

selecting, by the action recommendation manager, a first plurality of recommended actions from the subset of user actions for having the highest corresponding posterior probabilities among the plurality of posterior probabilities;

generating, by the action recommendation manager, a machine-learning matrix based on the first plurality of recommended actions and a performed user action from the client application and storing the machine-learning matrix in the database, wherein the machine-learning matrix contains associations among the plurality of pages and the plurality of user actions and preference values for the associations, and a machine-learning module in the action recommendation manager iteratively adjusts the preference values in the machine-learning matrix based on an action-value function until changes of the preference values are within a threshold; and in response to the client application displaying a second page selected from the plurality of pages, generating, by the action recommendation manager, a second plurality of recommended actions based on the machine-learning matrix, wherein the second plurality of recommended actions have the highest preference values based on the second page.

2. The method as recited in the claim 1, wherein the method further comprises:

transmitting the first plurality of recommended actions to the client application.

3. The method as recited in the claim 1, wherein the generating of the machine-learning matrix comprises:

when the performed user action is one of the first plurality of recommended actions, increasing a corresponding preference value of an association between the first page and the performed user action in the machine-learning matrix.

4. The method as recited in the claim 1, wherein the generating of the machine-learning matrix comprises:

when the performed user action is not one of the first plurality of recommended actions, decreasing a corresponding preference value of an association between the first page and the performed user action in the machine-learning matrix.

5. The method as recited in the claim 1, wherein for a subset of pages selected from the plurality of pages and the subset of user actions selected from the plurality of user actions, performing each of the subset of user actions from the first page of the client application generates a corresponding one of the subset of pages.

6. The method as recited in the claim 1, wherein the generating of the plurality of posterior probabilities comprises:

generating a corresponding posterior probability for each of the subset of user actions based on the corresponding prior probabilities of the first page, the subset of pages, and the subset of user actions.

7. The method as recited in claim 1, wherein the machine-learning module adapts a reinforcement learning approach by rewarding a first preference value of the preference values which corresponds to one of the first plurality of recommended actions and penalizing other preference values of the preference values which correspond to other recommended actions.

8. A non-transitory computer-readable storage medium, containing a set of instructions which, when executed by a processor, cause the processor to perform a method for automatically providing action recommendations in a cloud environment including one or more physical machines, one or more virtual machines, and a database, the method comprising:

collecting, by an action recommendation manager implemented in the cloud environment, a set of telemetry data from a client application operating in the cloud environment and storing the set of telemetry data in the database, wherein the set of telemetry data contains a plurality of pages generated based on a plurality of user actions performed on the client application;

generating, by the action recommendation manager, a plurality of prior probabilities corresponding to the plurality of pages and the plurality of user actions;

in response to the client application displaying a first page selected from the plurality of pages, generating, by the action recommendation manager, a plurality of posterior probabilities for a subset of user actions selected from the plurality of user actions based on the plurality of prior probabilities;

selecting, by the action recommendation manager, a first plurality of recommended actions from the subset of user actions for having the highest corresponding posterior probabilities among the plurality of posterior probabilities;

generating, by the action recommendation manager, a machine-learning matrix based on the first plurality of recommended actions and a first performed user action from the client application and storing the machine-learning matrix in the database, wherein the machine-learning matrix contains associations among the plurality of pages and the plurality of user actions and preference values for the associations, and a machine-learning module in the action recommendation manager iteratively adjusts the preference values in the machine-learning matrix based on an action-value function until changes of the preference values are within a threshold; and in response to the client application displaying, a second page selected from the plurality of pages, generating, by the action recommendation manager, a second plurality of recommended actions based on the machine-learning matrix, wherein the second plurality of recommended actions have the highest preference values based on the second page.

9. The non-transitory computer-readable storage medium of the claim 8, wherein the generating of the machine-learning matrix comprises:

when the performed user action is one of the first plurality of recommended actions, increasing a corresponding preference value of an association between the first page and the performed user action in the machine-learning matrix.

10. The non-transitory computer-readable storage medium of the claim 8, wherein the generating of the machine-learning matrix comprises:
when the performed user action is not one of the first plurality of recommended actions, decreasing a corresponding preference value of an association between the first page and the performed user action in the machine-learning matrix.

11. The non-transitory computer-readable storage medium of the claim 8, wherein the generating of the machine-learning matrix comprises:
in response to a determination that the performed user action is one of the plurality of recommended actions and the machine-learning matrix converges, stop-adjusting the preference values.

12. The non-transitory computer-readable storage medium as recited in claim 8, wherein the machine-learning module adapts a reinforcement learning approach by rewarding a first preference value of the preference values which corresponds to one of the first plurality of recommended actions and penalizing other preference values of the preference values which correspond to other recommended actions.

13. A system for automatically providing action recommendations in a cloud environment including one or more physical machines, one or more virtual machines, and a database, the system comprising:
a telemetry-data-collector implemented in the cloud environment and configured to collect a set of telemetry data from a client application operating in the cloud environment and store the set of telemetry data in the database, wherein the set of telemetry data contains a plurality of pages generated based on a plurality of user actions performed on the client application; and
a recommendation-module implemented in the cloud environment and coupled with the telemetry-data-collector, wherein the recommendation-module is configured to
generate a plurality of prior probabilities corresponding to the plurality of pages and the plurality of user actions,
in response to the client application displaying a first page selected from the plurality of pages, generate a plurality of posterior probabilities for a subset of user actions selected from the plurality of user actions and can be invoked in the client application from the first page, wherein the plurality of posterior probabilities are generated based on the plurality of prior probabilities, and
select a first plurality of recommended actions from the subset of user actions for having the highest corresponding posterior probabilities among the plurality of posterior probabilities;
a machine-learning module implemented in the cloud environment, wherein the machine-learning module is configured to
generate a machine-learning matrix based on the first plurality of recommended actions and a first performed user action from the client application and store the machine-learning matrix in the database, wherein the machine-learning matrix contains associations among the plurality of pages and the plurality of user actions and preference values for the associations, and;
iteratively adjust the preference values in the machine-learning matrix based on an action-value function until changes of the preference values are within a threshold; and
wherein the recommendation-module is further configured to in response to the client application displaying a second page selected from the plurality of pages, generate a second plurality of recommended actions based on the machine-learning matrix, wherein the second plurality of recommended actions have the highest preference values based on the second page.

14. The system of claim 13, wherein the machine-learning module is further configured to generate the machine-learning matrix by
when the performed user action is one of the first plurality of recommended actions, increasing a corresponding preference value of an association between the first page and the performed user action in the machine-learning matrix.

15. The system of claim 13, wherein the machine-learning module is further configured to generate the machine-learning matrix by
when the performed user action is not one of the first plurality of recommended actions, decreasing a corresponding preference value of an association between the first page and the performed user action in the machine-learning matrix.

16. The system as recited in claim 13, wherein the machine-learning module is configured to adapt a reinforcement learning approach by rewarding a first preference value of the preference values which corresponds to one of the first plurality of recommended actions and penalizing other preference values of the preference values which correspond to other recommended actions.

* * * * *